(12) United States Patent
Thies et al.

(10) Patent No.: US 10,806,092 B2
(45) Date of Patent: Oct. 20, 2020

(54) REMOTE CONTROL SYSTEM

(71) Applicant: Deere & Company, Moline, IL (US)

(72) Inventors: Eric M. Thies, Ottumwa, IA (US);
Gerald Shook, Fairfield, IA (US);
Tyler J. Brown, Des Moines, IA (US)

(73) Assignee: DEERE & COMPANY, Moline, IL (US)

( * ) Notice: Subject to any disclaimer, the term of this patent is extended or adjusted under 35 U.S.C. 154(b) by 235 days.

(21) Appl. No.: 16/029,152

(22) Filed: Jul. 6, 2018

(65) Prior Publication Data

US 2020/0008359 A1 Jan. 9, 2020

(51) Int. Cl.
*A01F 15/08* (2006.01)
*A01F 15/10* (2006.01)

(52) U.S. Cl.
CPC .......... *A01F 15/0841* (2013.01); *A01F 15/10* (2013.01)

(58) Field of Classification Search
CPC ...... A01D 43/06; A01D 89/00; A01D 89/008; A01D 69/00; A01F 15/0841; A01F 15/10; A01F 15/0833; A01F 15/106; A01F 15/0705; A01F 15/085
USPC .... 56/341, 16.1, 364, 14.9, 15.1–15.5, 15.9, 56/159, 192, 228; 100/88
See application file for complete search history.

(56) References Cited

U.S. PATENT DOCUMENTS

| | | | |
|---|---|---|---|
| 6,112,139 A | 8/2000 | Schubert et al. | |
| 6,644,006 B1* | 11/2003 | Merritt | A01D 69/00 56/11.2 |
| 6,971,225 B1* | 12/2005 | Kempf | A01D 57/20 56/398 |
| 7,730,704 B2* | 6/2010 | Viaud | A01F 15/106 56/16.1 |
| 8,413,414 B2* | 4/2013 | Herron | A01F 15/0705 56/341 |
| 9,528,576 B2 | 12/2016 | Anstey et al. | |
| 9,730,391 B2* | 8/2017 | Bonte | A01F 15/0841 |
| 10,018,171 B1 | 7/2018 | Breiner et al. | |
| 10,602,668 B2* | 3/2020 | Benevelli | B30B 9/3007 |
| 2010/0108413 A1* | 5/2010 | Lang | A01F 15/0841 180/53.1 |

* cited by examiner

*Primary Examiner* — Robert E Pezzuto
(74) *Attorney, Agent, or Firm* — Michael Best & Friedrich LLP (57) ABSTRACT

A baling system including a working component, where the working component has at least one of a pickup assembly, a rotor assembly, or a lifter assembly, a frame supporting the working component, a first drive system configured to drive the working component, a second drive system configured to drive the working component, and a remote controller configured to selectively control the operation of the second drive system when the first drive system is operatively disengaged from the working component.

20 Claims, 6 Drawing Sheets

REMOTE CONTROL SYSTEM

BACKGROUND

The present disclosure relates to control systems for agricultural equipment, and in particular relates to a remote control system for a baler.

Balers use a series of performance systems to gather dried agricultural material, such as hay or straw, and compress and shape the agricultural material into bales. Several different types of balers are capable of forming the agricultural material into bales of different sizes and shapes. A typical baler gathers hay using a pickup portion and then moves the hay via an auger into a pre-compression chamber. A feeding fork compresses the hay to a pre-selected density and then sweeps the hay from the pre-compression chamber to the baling chamber. The baling chamber includes a plunger that slides within the chamber to compress and shape the hay into bales.

Agricultural machines, including balers, are known to use a primary drive source to power the multiple performance systems, each of which is designed to accomplish a task within the overall function of the machine. These performance systems may require periodic maintenance, trouble shooting, or adjustment for proper operation. Executing the maintenance or adjustment procedure often requires precise positioning of the parts in the performance system and/or advancing the parts through an operating cycle of the system in a slow, controlled manner for observation of individual components. A secondary drive source may be used to operate the agricultural machine in a slow, controlled manner to resolve the issue.

As part of this maintenance/adjustment procedure, it may be necessary for an operator to exit the agricultural machine to view the individual components. The operator may have to exit and return to the baler several times to control and observe the performance until the issue is resolved. This can be time consuming and may result in much trial and error until the maintenance is complete.

SUMMARY

In one aspect, the disclosure provides a baling system including a frame, a first drive system configured to drive a working component of the baling system, where the working component includes at least one of a pickup assembly, a rotor assembly, or a lifter assembly supported by the frame, and a second drive system configured to drive the working component. A local controller includes a user interface and is configured to receive an operator input designating a parameter related to an operational characteristic of the second drive system via the user interface. A remote controller is configured to selectively control the operational characteristic of the second drive system subject to the designated parameter.

In another aspect, the disclosure provides a baling system including a working component, where the working component has at least one of a pickup assembly, a rotor assembly, or a lifter assembly, a frame supporting the working component, a first drive system configured to drive the working component, a second drive system configured to drive the working component, and a remote controller configured to selectively control the operation of the second drive system when the first drive system is operatively disengaged from the working component.

In yet another aspect, the disclosure provides a method of controlling a baling system having a working component in the form of a pickup assembly, a rotor assembly, or a lifter assembly, where the baling system further includes a drive system and an operator station with a local controller configured to control the working component. The method includes identifying an operational condition of the working component for which field maintenance is required. The method further includes, in response to the identifying, activating, using a remote controller separate from the local controller, the drive system to drive the working component. The method further includes inputting a parameter of an operational characteristic of the drive system via a user interface of the local controller.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of embodiments described herein may be implemented in software (for example, stored on non-transitory computer-readable medium) executable by one or more processors. As such, it should be noted that a plurality of hardware and software based devices, as well as a plurality of different structural components may be utilized to implement the described embodiments. For example, "controller" and "control unit" described in the specification may include one or more electronic processors, one or more memory modules including non-transitory computer-readable medium, one or more input/output interfaces, and various connections (for example, a system bus) connecting the components.

DETAILED DESCRIPTION

The disclosure relates to an agricultural system such as a baling system. In the illustrated implementation, the disclosure relates to a square baler for forming bales of a crop, such as hay. In other implementations, the disclosure may relate to other types of balers, such as other extrusion type balers or non-extrusion type balers, round balers, etc. In yet other implementations, the disclosure may relate to other types of machines, e.g., vehicles, tractors, harvesters, other types of agricultural machines, forestry machines, mining machines, construction machines, machines for manufacturing, etc.

As will be described in greater detail below, balers perform a series of processes to convert hay into square bales. Specifically, the baler lifts hay from the ground and transfers the hay to a pre-compression chamber. In the pre-compression chamber, the hay is compressed to a preselected density and then swept into a baling chamber where the hay is further compressed and shaped into bales. Once sufficiently compressed, the bales are moved through a bale case, where the bales are wrapped with twine and eventually released from the baler.

During the baling process, the baler may become clogged and require maintenance to remove the clog before continuing to operate the baler. When this occurs, an operator may run the baler at a slower operational speed or may reverse the direction of operation of the baler in order to remove the clog. During this process, the operator may be better able to service the baler by exiting the operator station in order to observe the clog and the working components of the baler. Accordingly, the baler disclosed herein provides a remote control system for controlling the baler from a location outside of the baler.

Figure 1:
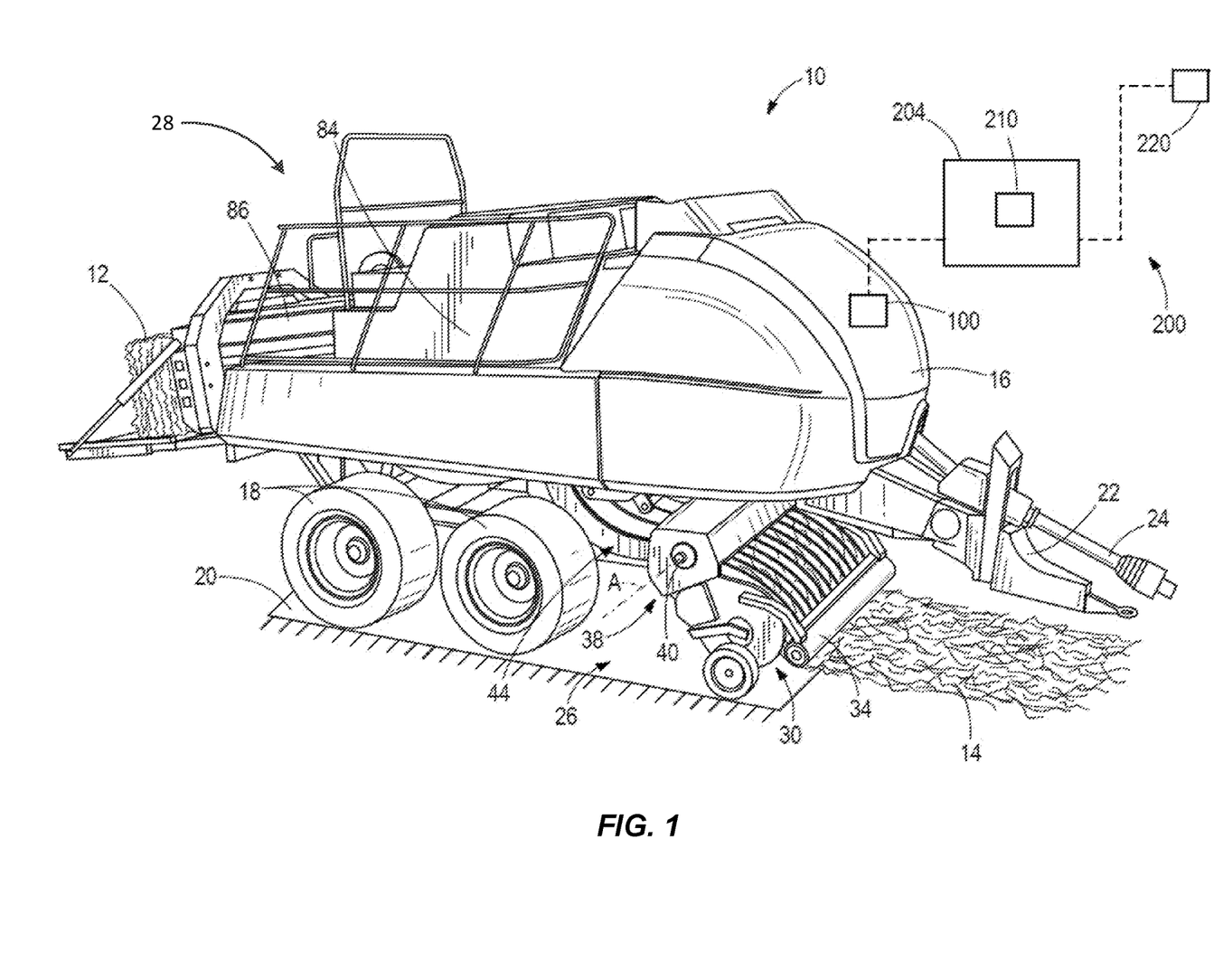
FIG. 1 is a perspective view of an agricultural machine according to a first embodiment.

FIG. 1 illustrates a baler 10 according to one embodiment. The baler 10 includes a frame 16 supported by wheels 18 for travelling along a support surface 20, such as a field or road. In some embodiments, the baler 10 may be a self-propelled baler, while in other embodiments the baler 10 may be a combination baler and a towing vehicle. A self-propelled style of baler 10 includes a prime mover on board the baler 10 to drive the wheels 18 of the baler 10 and move the baler 10 across the surface 20. In a towed style baler 10, the towing vehicle includes a prime mover to drive the wheels 18 of the baler 10 and move the baler 10 across the surface 20. The baler 10 described herein is primarily described with respect to a towed style baler, however, a person skilled in the art will understand that the present description may also apply to a self-propelled baler. A tow bar 22 is attached to the frame 16 and is connectable to a towing vehicle (not shown), such as an agricultural tractor or other driven vehicle. The baler 10 also includes a power takeoff shaft 24 connectable to the towing vehicle to transmit a rotating drive force from the towing vehicle to various components of the baler 10, such as the components that collect crop 14 and form bales 12 (together "the baling system).

The baling system includes a feed system 26 and a compression system 28. The feed system 26 picks up the crop 14 from the surface and conveys the crop 14 to the compression system 28 to be formed into a bale 12. The compression system 28 compresses the crop 14 (e.g., by way of a plunger or a belt) into a densely packed shape, such as a square or round bale 12.

Figure 2:
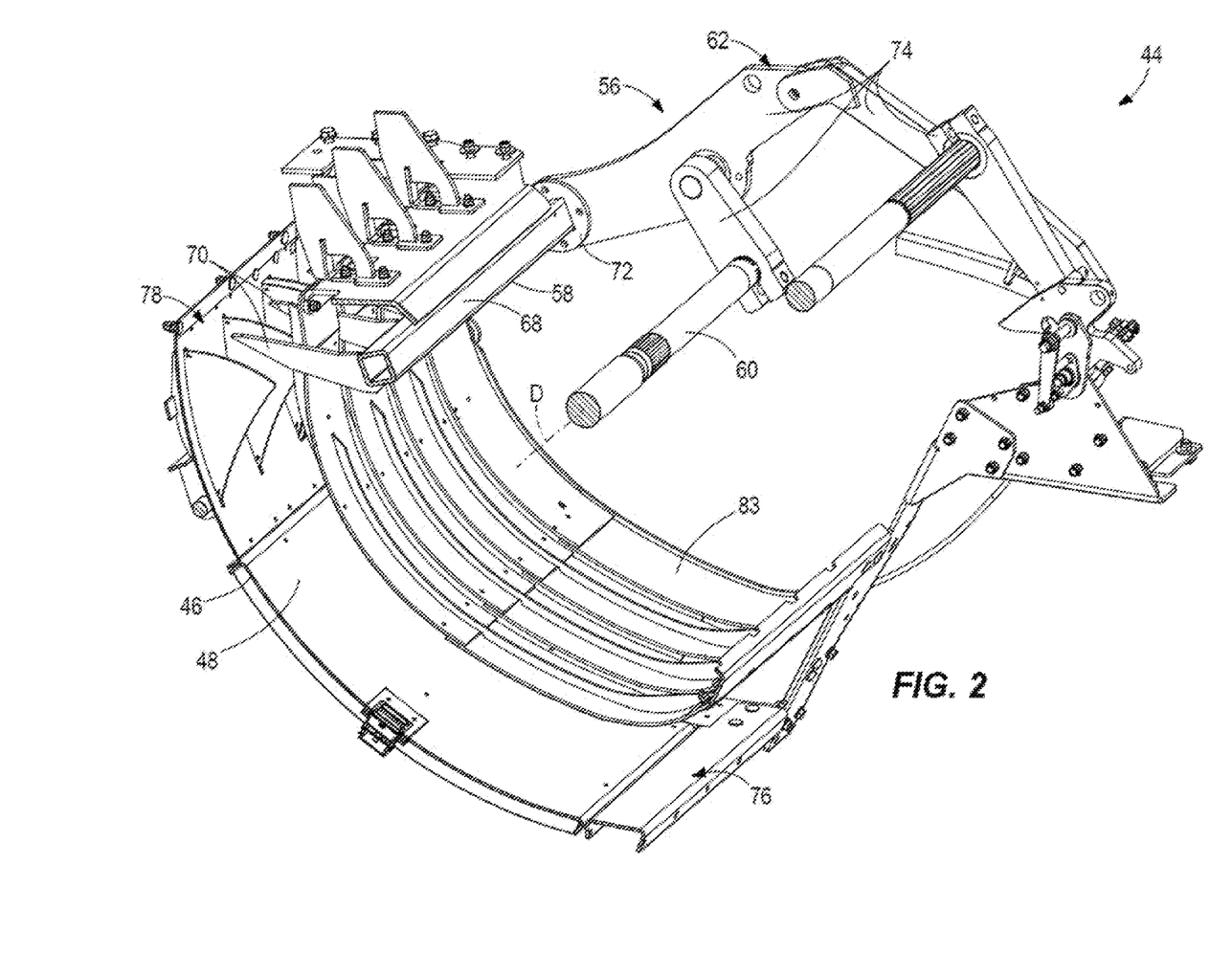
FIG. 2 is a perspective view of working components of a baling system for use in the agricultural machine of FIG. 1.
Figure 3:
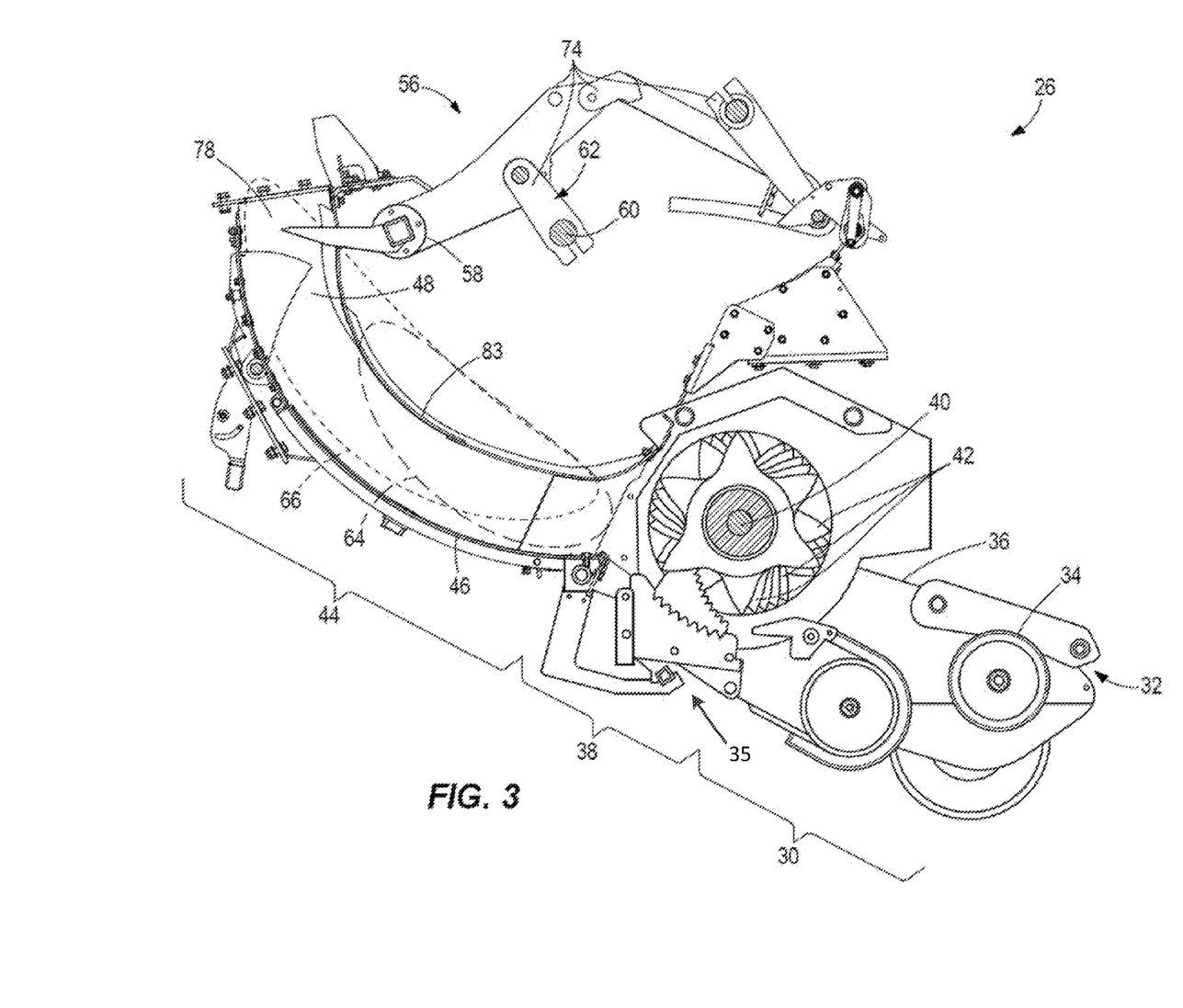
FIG. 3 is a side view of working components of a baling system for use in the agricultural machine of FIG. 1.

In the implementation illustrated in FIGS. 2 and 3, the feed system 26 includes a pickup assembly 30, a rotor assembly 38, and a lifter assembly 44. Also, in some embodiments, the feed system includes a pre-cutter assembly 35. The pickup assembly 30 defines an inlet 32 for receiving the crop 14 from the surface. The pickup assembly 30 includes a roller baffle 34 for picking up the crop 14 and placing the crop 14 in the baler 10. The pickup assembly 30 includes a pickup plate 36 disposed adjacent the roller baffle 34 for conveying the crop 14 towards a rotor assembly 38. The pickup plate 36 may include a continuous loop surface, e.g., a moving conveyor, driven for conveying the crop 14, or other suitable mechanisms. The rotor assembly 38 includes an elongated shaft 40 carrying a series of cutters or rotor tines 42 for cutting the crop 14. The rotor assembly 38 rotates about a central axis A (shown in FIG. 1) of the shaft 40.

The lifter assembly 44 has a feed pan 46 and strippers 83 cooperating with the pickup assembly 30 and the rotor assembly 38 for receiving the crop 14 from the rotor assembly 38. The feed pan 46 and the strippers 83 define a pre-compression chamber 48, along with any side walls (not shown) extending generally from the feed pan 46 toward the strippers 83. The lifter assembly 44 also includes a loading fork 56 cooperating with the feed pan 46 and movable through the feed pan 46 within the pre-compression chamber 48 for recompressing the crop 14, thereby increasing the crop load in the pre-compression chamber 48.

The loading fork 56 includes a fork member 58 coupled to a driving shaft 60 by a loading fork linkage 62. The driving shaft 60 is rotatable about a stationary drive axis D for driving the fork member 58 along a pack path 64 and a lift path 66, as illustrated in FIG. 3. The fork member 58 includes a fork bar 68 having an elongated shape and a plurality of forks 70 extending from the fork bar 68 towards the feed pan 46. In other implementations, the fork member 58 may have other shapes and configurations for sweeping the crop 14. The fork member 58 is rotatably coupled to the loading fork linkage 62 at a fork member joint 72. The loading fork linkage 62 includes a plurality of arms 74, at least one of which is interconnected between the fork member 58 and the driving shaft 60.

The loading fork linkage 62 is operable in a pack mode and a lift mode. In the pack mode, the loading fork linkage 62 assumes a pack configuration in which the fork member 58 is driven through the pack path 64 on a pack stroke. In the lift mode, the loading fork linkage 62 assumes a lift configuration in which the fork member 58 is driven through the lift path 66 on the lift stroke. In the pack path 64, the fork member 58 directs crop 14 from the rotor assembly 38 into the feed pan 46 and compresses the crop 14 in the pre-compression chamber 48. In the lift path 66, the fork member 58 conveys the crop 14 into the compression system 28. The load of crop conveyed into the compression system 28 on the lift stroke is called a flake.

In other implementations, the feed system 26 may include other structures and configurations, such as those known in other types of balers, such as round balers.

Referring back to FIG. 1, the compression system 28 includes a plunger (not shown) for compressing the crop 14, a bale chamber 84 for receiving and shaping the compressed crop 14, and a bale case or extruder 86 for compressing and dispensing/extruding the compressed crop 14 in the form of a bale 12.

The bale chamber 84 is disposed adjacent the supplying end 78 of the feed pan 46 for receiving a load of crop, i.e., the flake, from the pre-compression chamber 48. Generally, in the pack mode, the fork member 58 packs crop in the pre-compression chamber 48 and, in the lift mode, the fork member 58 lifts crop from the pre-compression chamber 48 and lifts the crop into the bale chamber 84. The plunger (not shown) is configured for reciprocating motion in the bale chamber 84 to compact and compress the crop 14 in the bale chamber 84 on each lift stroke. In the illustrated implementation, the bale chamber 84 has a rectangular cross-section for forming square or rectangular bales; however, in other implementations the bale chamber 84 may have other cross sections and configurations. As the bale 12 forms, the bale 12 is packed from the bale chamber 84 into the bale case 86 from which the bale 12 is extruded and/or released. Between the bale chamber 84 and the bale case 86, a knotter assembly (not shown) dispenses, wraps, cuts, and ties loops of twine around the bale 12 in response to a bale length sensor (not shown), such as a star wheel, when a predetermined bale length is reached.

In other implementations, the compression system 28 may include other structures and configurations, such as those known in other types of balers, such as round balers.

Figure 4:
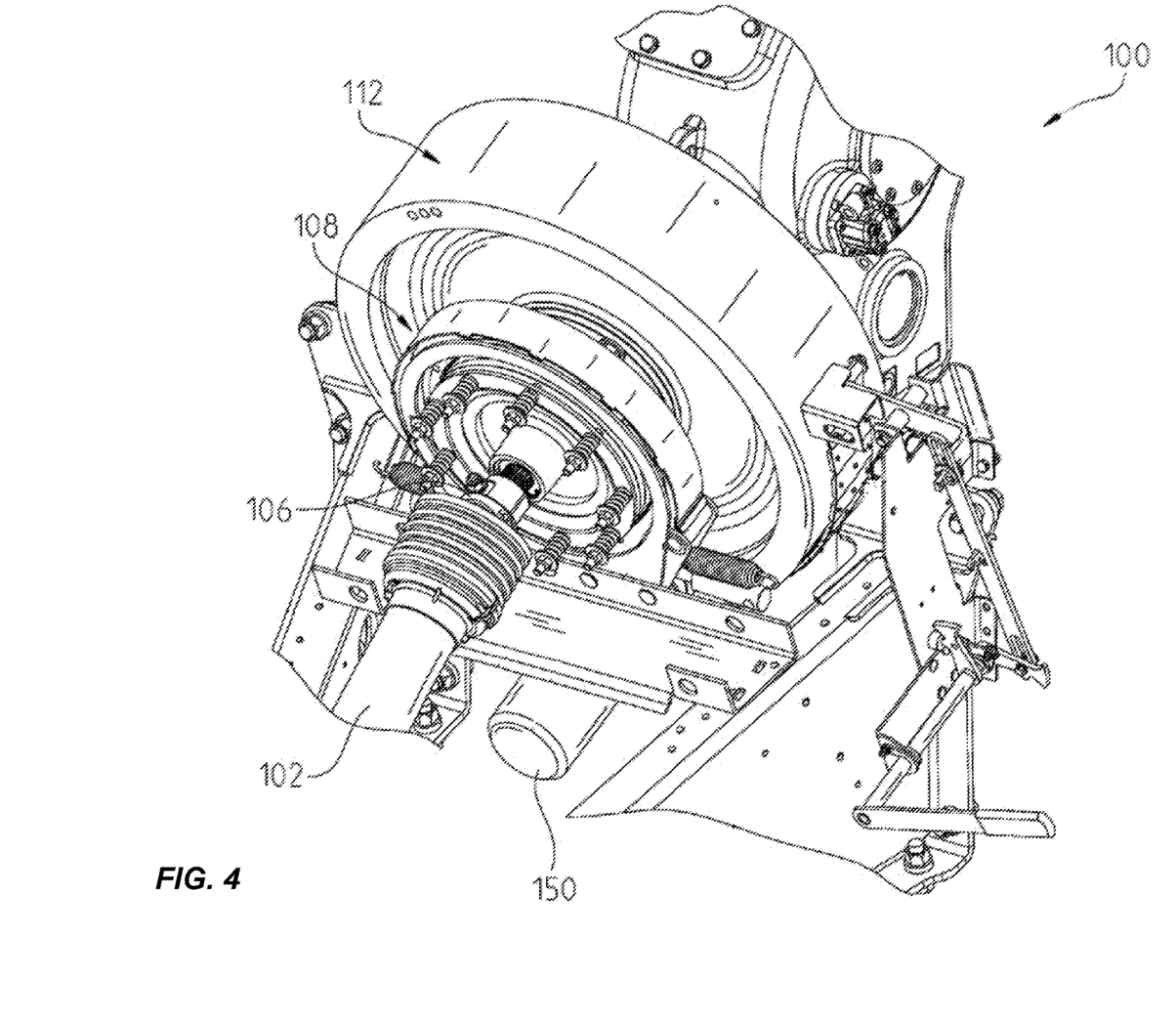
FIG. 4 is a perspective view of a drive system for use with the agricultural machine of FIG. 1.
Figure 5:
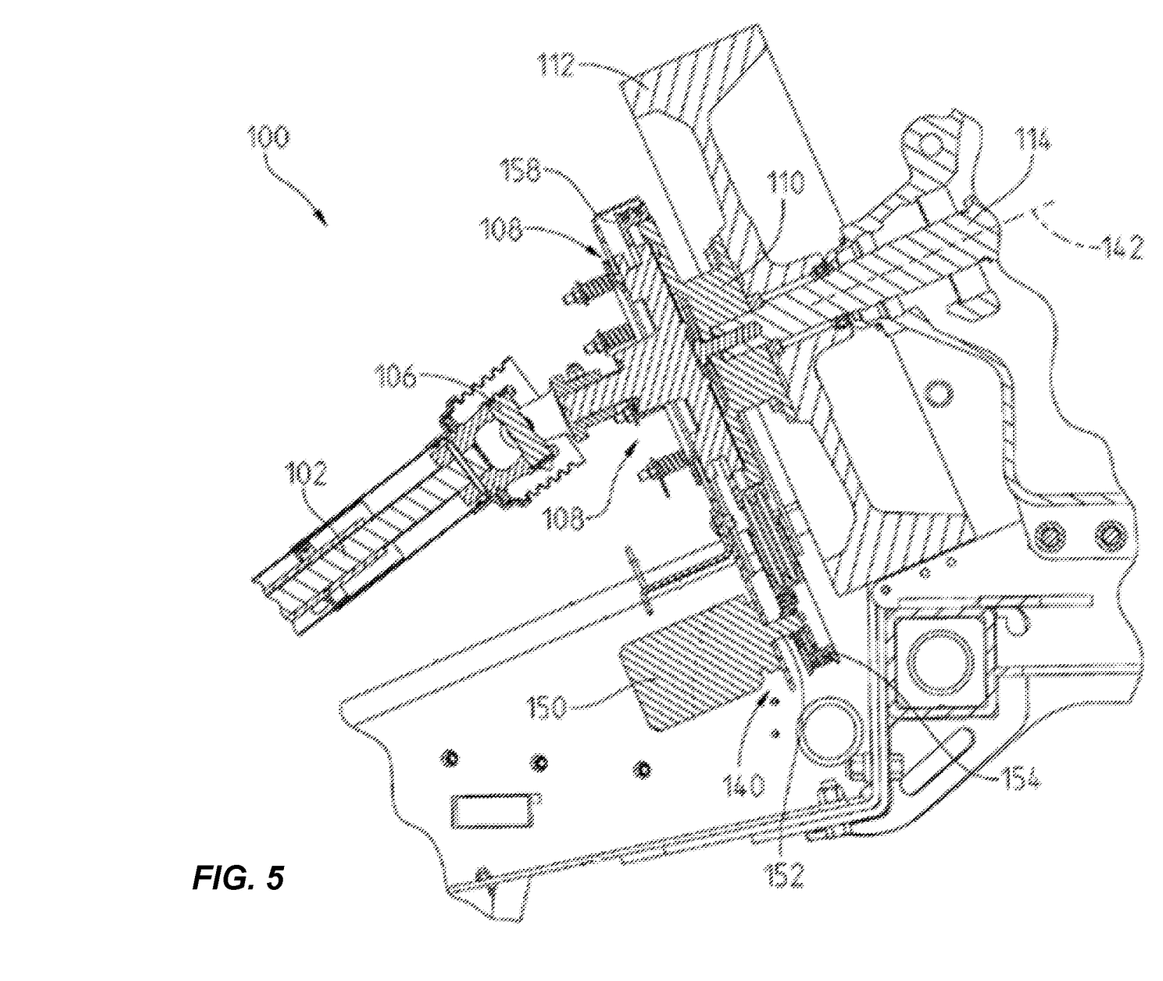
FIG. 5 is a side view of the drive system of FIG. 4.

With reference to FIGS. 4 and 5, the baling system (i.e., the feed system 26 and the compression system 28) is powered by a first drive system 100. In a towed style baler 10, the first drive system 100 is located, at least in part, on the towing vehicle. (In a self-propelled style baler 10, the first drive system 100 is located on the baler 10.) In the illustrated embodiment, the first drive system 100 includes a drive shaft 102 having a first end connected to the power takeoff shaft 24 to transmit rotational force from a tractor to the baler 10. A second end of the drive shaft 102 is coupled to a torque limiting clutch assembly 108 via a u-joint 106. The clutch assembly 108 is configured to disengage the power takeoff shaft 24 from a hub 110, to which the clutch assembly 108 is connected, should the hub 110 be subjected to a predetermined amount of excessive torque. The clutch assembly 108 acts as a torque limiting device configured to reduce or prevent damage to the first drive system 100 when experiencing excessive loads. Accordingly, the clutch assembly 108 is capable of operatively engaging and disengaging the power takeoff shaft 24 from the first drive system 100.

The first drive system 100 further includes a flywheel 112, which is used to store rotational energy delivered by the power takeoff shaft 24. The flywheel 112, in turn, delivers power to the working components of the baling system described above. Specifically, the hub 110 is fixedly coupled to the flywheel 112, which is fixedly coupled to a secondary drive shaft 114. The secondary drive shaft 114 is operatively connected to the above described working components of the baling systems and subsystems for picking up crop, compressing hay, forming bales, and tying bales.

Under some circumstances, baling operations can fail if the amount of cut crop becomes excessive, or if a foreign object, such as a large rock, interferes with the baling operation. In each of these situations, the flywheel 112 can continue to move, but becomes disconnected from the power takeoff shaft 24, through the action of the clutch assembly 108. Consequently, the final resting location of the flywheel 112 can be at a position which is not conducive to removal of the obstruction or for eliminating the condition which has caused the baler to malfunction.

Accordingly, the baler 10 includes a second drive system 140 that is configured to drive the hub 110, the flywheel 112, and the secondary drive shaft 114, and in turn, the working components of the baling system. The second drive system 140 can provide the operator with independent and greater control over the operation of the flywheel 112 and the working components of the baling system in order to repair, adjust, or unclog the baler 10. Specifically, the second drive system 140 can control various drive system characteristics (e.g., an operational characteristics), such as speed and direction of operation. In the illustrated embodiment, the second drive system 140 can drive the flywheel 112 at different speeds when it is desired to rotate the flywheel 112 faster or slower. Additionally, the second drive system 140 can operate the flywheel 112 and the secondary drive shaft 114 in both a forward direction (e.g., a clockwise direction) and a reverse direction (e.g., a counter clockwise direction) about a longitudinal axis 142 of the drive shaft 114. Providing the second drive system 140 with greater control over various drive system characteristics may allow the operator to resolve the maintenance issue easier. For example, when the working components of the baler 10 become clogged, the operator can continuously adjust the characteristics of the drive system by speeding up and slowing down the second drive system 140 or running the baler 10 in forward and reverse until the clog is removed.

As illustrated in FIGS. 4 and 5, the second drive system 140 includes a motor 150 operatively coupled to the drive shaft 114 to operate the baling system. In one embodiment, the motor 150 is a hydraulic motor configured to supply a flow of pressurized fluid to drive a drive shaft 152 directionally or rotationally in a first direction and a second direction depending on the direction of fluid flow. In another embodiment, the motor 150 is a pneumatic pump coupled to a pneumatic system and configured to rotate the drive shaft 152 in either a first or second direction. In still another embodiment, the motor 150 is an electric motor coupled to an electric system and configured to rotate the drive shaft 152 in either a first or second direction.

A first pulley wheel 154 is operatively connected to the drive shaft 152. A second pulley wheel 158 is fixedly coupled to the clutch assembly 108 and the hub 110. The second pulley 158 is fixed to the clutch assembly 108 and to the hub 110 such that rotational movement of the second pulley 158 moves both the clutch assembly 108 and the hub 110. Consequently, rotation of the shaft 152 by the motor 150 moves the first pulley 154, which in turn, moves the second pulley 158 and the hub 110. Rotation of the hub 110 drives the flywheel 112 and the drive shaft 114, which moves the working components of the baling system.

The baler 10 further includes a control system 200 for controlling the operation of the baler 10. The control system 200 includes a local controller 210 located on or in an operator station 204 (shown schematically in FIG. 1) and a remote controller 220 for wirelessly communicating with the local controller 210. As defined herein, an operator station 204 can include a control station, a control board, an operator cabin, and the like. The operator station 204 may be an enclosed space with an operator seat and other controllers for the baler 10. Alternatively, the operator station 204 may be in an unenclosed area. The operator station 204 can be located on the baler 10, the towing vehicle, or both the baler 10 and the towing vehicle (i.e., there may be multiple operator stations). The local controller 210 is located on board the baler 10, the towing vehicle or both the baler and the towing vehicle (e.g., a controller including multiple processors/control units). The remote controller 220 is capable of controlling at least some operations of the baler 10 from a location outside of the operator station 204 or away from the local controller 210. For example, the remote controller 220 may be mobile with the operator so that the operator can walk away from the local controller 210 and the operator station 204 and continue to control certain operations of the baler 10 with the remote controller 220.

In the illustrated implementation, an operator generally operates the baler 10 from the operator station 204 on the towing vehicle. However, in other implementations, the operator station 204 may be located on the baler 10 itself. When the baler 10 encounters a problem requiring maintenance, such as a clog in the baling system, an operator can exit the operator station 204 and continue to control at least some functions of the baler 10 using the remote controller 220. For example, in the illustrated embodiment, the operator can control the second drive system 140 via the remote controller 220 in order to operate the baling system at a desired speed and/or operational direction (i.e., forward or reverse).

Figure 6:
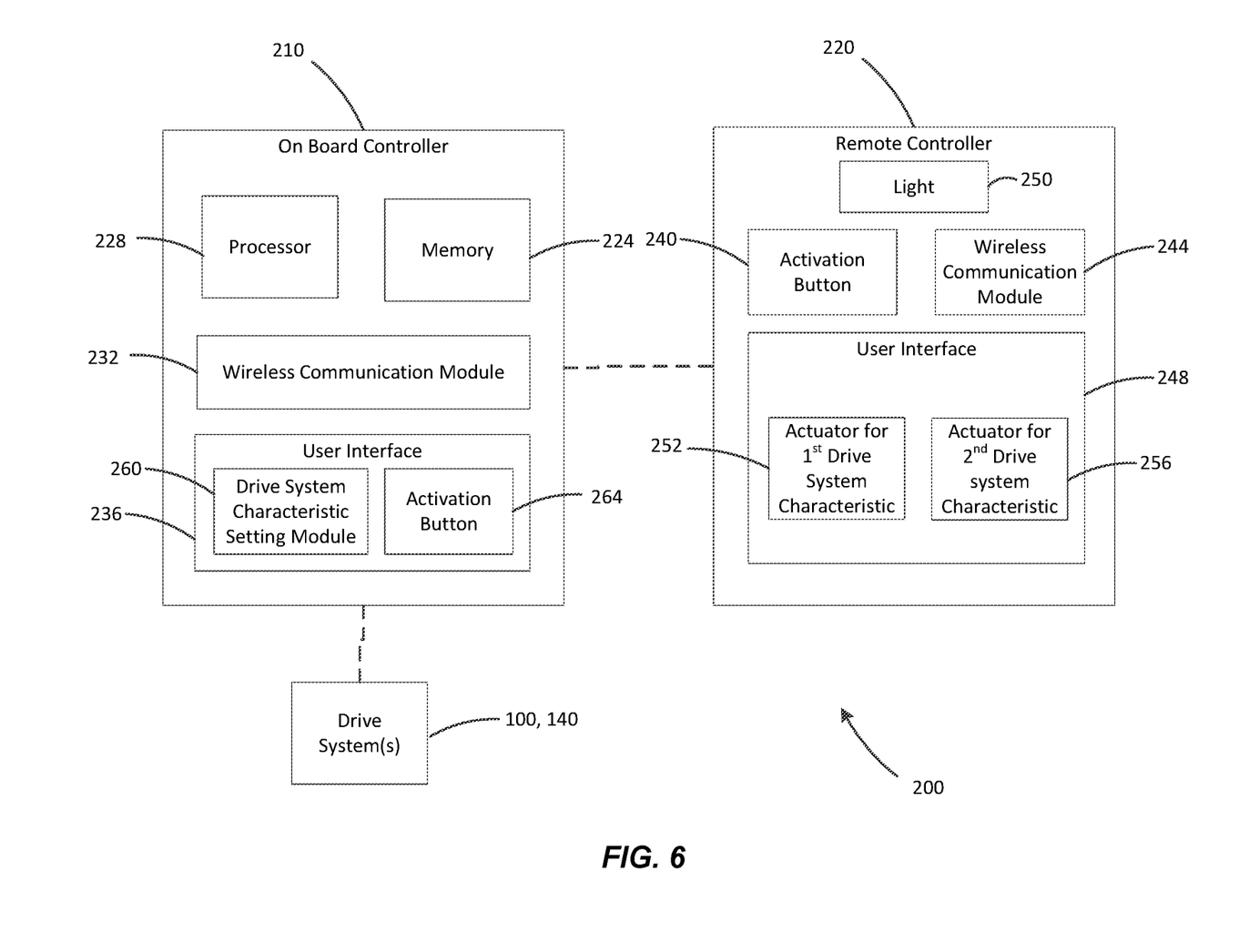
FIG. 6 is a schematic diagram of a control system for use with the agricultural machine of FIG. 1.

FIG. 6 schematically illustrates one embodiment of a control system 200. The local controller 210 includes a memory 224, a processor 228, a wireless communication module 232, and a user interface 236. The remote controller 220 includes an activation button 240, a wireless communication module 244, and a user interface 248. In some embodiments, the remote controller further includes a light 250. The local controller 210 is configured to receive a signal from the remote controller 220 and control at least one of the drive systems 100 and 140 based on the signal from the remote controller 220. The local controller 210 and the remote controller 220 can communicate through any wireless communication system known in the art, via the wireless communication modules 232 and 244, respectively.

The operator can control one or more drive system characteristics from the remote controller 220 via the user interface 248. In particular, the user interface 248 of the remote controller 220 includes a plurality of actuators 252, 256 for controlling various drive system characteristics of the baler 10, such as the speed and/or direction of operation of the baling system. For example, the user interface 248 illustrated in FIG. 6 includes a first actuator 252 for controlling a first drive system characteristic, and a second actuator 256 for controlling a second drive system characteristic. In some embodiments, the first actuator 252 controls the speed of one of the drive systems 100, 140 of the baling system. In some embodiments, the second actuator 256 controls the operational direction (i.e., forward or reverse) of the baling system.

Additionally, in some implementations, the control system 200 may enable an operator to designate parameters or provide a parameter range of a drive system characteristic. In the illustrated embodiment, the local controller 210 includes a drive system characteristic setting module 260 that enables an operator to input parameters of a drive system characteristic. For example, an operator may input a parameter designating a maximum or a minimum speed of one of the drive systems 100, 140. The operator may also input a parameter range, which permits the first drive system 100, 140 to operate within (i.e., subject to) an allowed range of speeds. The drive system characteristic setting module 260 also allows an operator to input off-limit parameters. For example, an operator my input an off-limit parameter prohibiting the drive systems 100, 140 from operating in reverse.

In the illustrated implementation, the drive system characteristic setting module 260 is integrated within the user interface 232 of the local controller 210. However, in other implementation, the drive system characteristic setting module 260 is not integrated within the user interface 232, and may instead be integrated with a separate control system.

Additionally, the drive system characteristic setting module 260 can be used to limit the capabilities of the remote controller 220. At times it may be desirable to limit the control functions of the remote controller 220, for instance, prohibiting an operator from having full control of the baler 10 when the operator is not inside the operator station 204. Accordingly, the parameters input into the drive system characteristic setting module 260 may prohibit the remote controller 220 from controlling the drive systems 100, 140 outside of the parameters designated in the drive system characteristic setting module 260. However, the control system 200 may continue to allow the local controller 210 to control the drive systems 100, 140 outside of the parameters designated in the drive system characteristic setting module 260. For example, the control system 200 may restrict the operator from operating the baler 10 beyond a maximum speed designated in the drive system characteristic setting module 260 if the operator is controlling the baler 10 from the remote controller 220. However, when the operator returns to the operator station 204 and is controlling the baler 10 from the local controller 210, the operator may control the drive systems 100, 140 beyond the maximum speed.

Furthermore, the control system 200 may be provided with features intended to prevent the operator from unintentionally operating the baler 10 with the remote controller 220. In some implementations, the remote controller 220 is registered (e.g., paired) with a single baler 10 so that the remote controller 220 is only capable of communicating with the local controller 210 corresponding to the specific baler 10. In some implementations, the remote controller 220 may not be activated until the drive systems 100, 140 are operating according to a specified standard. For example, the drive systems 100, 140 may be required to be operating below a predetermined speed, in an off-mode, or in a specific operation direction.

In some implementations, the remote controller 220 is only capable of controlling the drive systems 100, 140 of the baler 10 after certain activation settings are armed. The operator may be required to activate the remote controller 220 via the local controller 210. For example, in one embodiment, the operator navigates to a Controller Assist page on the user interface 232 of the local controller 220 and actuates an activation button 264. The operator may also be required to press the activation button 240 on the remote controller 220 in order to arm the remote controller 220. In some instances, the operator may be required to press and hold the activation button 240 or may be required to press the activation button 240 twice within a predetermined time frame in order to arm the remote controller 220. Furthermore, in some embodiments, the activation button 240 on the remote controller 220 must first be armed by the activation button 264 on the local controller 210. In other embodiments, the activation button 240 may be a slide button or another type of arming mechanism. Furthermore, in some embodiments, the user interface 248 of the remote controller 220 may be deactivated after inactivity for a predetermined time (e.g., after 15 seconds of inactivity).

In operation, when the baler 10 encounters an issue, such as a clog or other maintenance problem, the operator utilizes the user interface 232 of the local controller 210 to arm the remote controller 220. The operator then activates the remote controller 220 by pressing the activation button 240 on the remote controller 220. Before using the remote controller 220, the operator has the option of limiting the capability of the remote controller 220 to control certain drive system characteristics beyond designated parameters. To do this, the operator inputs the desired parameters into the drive system characteristic setting module 260.

Once activated, the remote controller 220 is capable of controlling one or both of the drive systems 100, 140 within the parameter designated in the drive system characteristic setting module 260. The operator may use the remote controller 220 to control the baler 10 in a manner to resolve the issue or remove the clog. For example, the operator may continually adjust the speed and direction of operation of the drive systems 100, 140 until the clog is dislodged.

Accordingly, the control system provided herein enables an operator of an agricultural machine to control the operation of the machine from both a local controller and a remote controller. This provides the operator with the flexibility to leave the operator station in order to obtain a better view of the working components of the machine. The controller system also enables the operator to resolve the maintenance issue without having to repeatedly exit the machine to view the working components and then return to the operator station to control the machine.

Various features of the disclosure are set forth in the following claims.

What is claimed is:

1. A baling system comprising:
   a frame;
   a first drive system configured to drive a working component of the baling system, the working component including at least one of a pickup assembly, a rotor assembly, or a lifter assembly supported by the frame;
   a second drive system configured to drive the working component;
   a local controller configured to receive, via a local controller user interface, an operator input associated with a parameter related to an operational characteristic of the second drive system, the operator input configured to limit the parameter; and
   a remote controller configured to selectively control the operational characteristic of the second drive system subject to the limited parameter.

2. The baling system of claim 1, wherein the local controller is located on or in an operator station, and wherein the remote controller is operable to control the second drive system by wirelessly communicating with the local controller.

3. The baling system of claim 1, wherein the second drive system is operable in a forward direction and a reverse direction, and wherein the remote controller includes an actuator for controlling a direction of the second drive system.

4. The baling system of claim 1, wherein the second drive system is operable at a plurality of speeds, and wherein the remote controller includes an actuator for controlling a speed of the second drive system.

5. The baling system of claim 1, wherein the operational characteristic of the drive system includes at least one of a speed of the second drive system or a direction of operation of the second drive system.

6. The baling system of claim 1, wherein the limited parameter includes at least one of a range, a maximum, or a minimum of an operational speed of the second drive system.

7. The baling system of claim 1, further comprising a towing vehicle including a plurality of wheels configured to move the towing vehicle across a surface, wherein the first drive system is located on the towing vehicle.

8. The baling system of claim 1, wherein the operator input is associated with a parameter related to an operational characteristic of the first drive system, the operator input configured to limit the parameter, and wherein the remote controller is configured to selectively control the operational characteristic of the first drive system subject to the limited parameter related to the operational characteristic of the first drive system.

9. The baling system of claim 1, further including a clutch assembly configured to operatively disengage the first drive system from the working component, and wherein the remote controller is configured to selectively control the operational characteristic of the second drive system when the first drive system is operatively disengaged from the working component.

10. The baling system of claim 1, wherein at least one of the remote controller or the local controller further includes an activation button actuatable to activate the remote controller.

11. The baling system of claim 1, wherein the limited parameter includes an off-limit parameter.

12. The baling system of claim 11, wherein the off-limit parameter is configured to prohibit an operational direction of the second drive system.

13. A baling system comprising:
    a working component including at least one of a pickup assembly, a rotor assembly, or a lifter assembly;
    a frame supporting the working component;
    a first drive system configured to drive the working component;
    a second drive system configured to drive the working component;
    a local controller configured to receive an operator input limiting a parameter related to an operational characteristic of the second drive system; and
    a remote controller configured to selectively control the operation of the second drive system subject to the limited parameter when the first drive system is operatively disengaged from the working component.

14. The baling system of claim 13, further including a clutch assembly configured to operatively disengage the first drive system from the working component.

15. The baling system of claim 13, wherein the second drive system is operable in a forward direction and a reverse direction, and wherein the remote controller includes an actuator for controlling a direction of the second drive system.

16. The baling system of claim 13, wherein the second drive system is operable at a plurality of speeds, and wherein the remote controller includes an actuator for controlling a speed of the second drive system.

17. The baling system of claim 13, further comprising a towing vehicle configured to tow the frame and the working component, wherein the first drive system is located on the towing vehicle.

18. The baling system of claim 17, wherein the towing vehicle further includes ground engaging wheels and a prime mover, the prime mover configured to drive the ground engaging wheels to move the towing vehicle across a surface.

19. A baling system comprising:
    a prime mover supported by 1) a baler of the baling system or 2) a towing vehicle operatively coupled to the baler, to drive wheels of the baler;
    a working component including at least one of a pickup assembly, a rotor assembly, or a lifter assembly;
    a frame supporting the working component;
    a first drive system configured to drive the working component;
    a second drive system configured to drive the working component;
    a first controller configured to receive an operator input limiting an operational parameter of the second drive system; and
    a second controller configured to selectively control from a location outside of the baling system the operation of the second drive system subject to the limited operational parameter.

20. The baling system of claim 19, wherein the operational parameter includes at least one of 1) a range, a maximum, or a minimum of an operational speed of the second drive system or 2) an off-limit operational direction of the second drive system.

* * * * *